April 12, 1938.                I. PENSKY                2,114,149
                         HANDLE FOR TOOTH BRUSHES
                           Filed Jan. 23, 1937
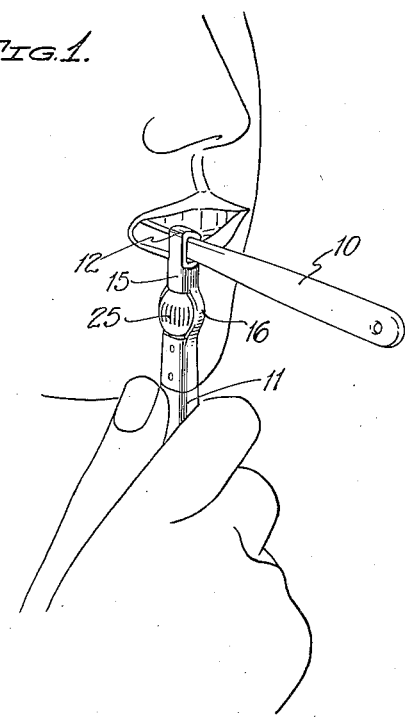
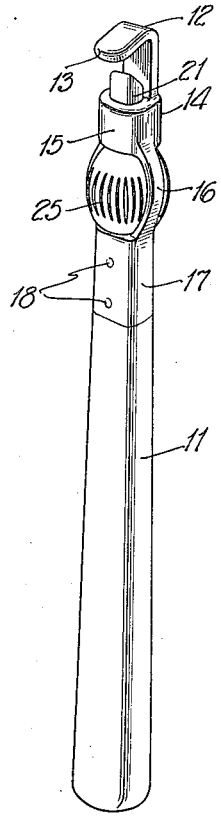
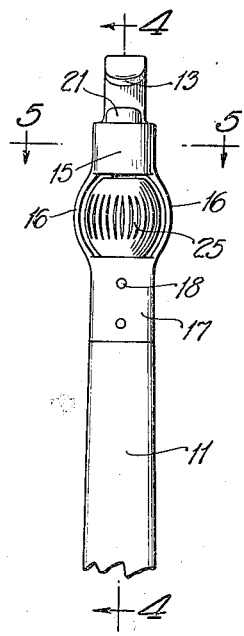
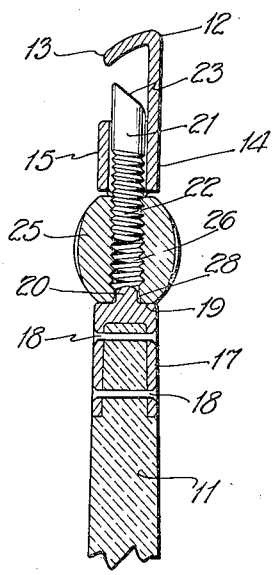
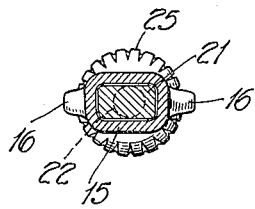
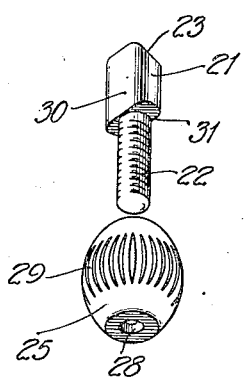
IRVING PENSKY.
INVENTOR.
BY Ely Pattison
ATTORNEYS.

Patented Apr. 12, 1938

2,114,149

UNITED STATES PATENT OFFICE 2,114,149

HANDLE FOR TOOTH BRUSHES

Irving Pensky, Brooklyn, N. Y.

Application January 23, 1937, Serial No. 122,013

1 Claim. (Cl. 15—146)

This invention relates to new and useful improvements in brushes for brushing the teeth and more particularly it pertains to a supplemental handle intended for attachment to the handle of a conventional tooth brush.

In the brushing of the teeth it is highly desirable that an up and down movement of the brush head relative to the teeth be obtained. This action is awkward with a tooth brush of the conventional type and it is one object of the present invention to provide novel means for attachment to a conventional tooth brush in order that the aforementioned action may be conveniently obtained.

It is a further object of the invention to provide means which may be attached or detached with respect to a conventional tooth brush handle readily and without damage to the conventional tooth brush handle.

It is a further object of the invention so to construct the device that the supplemental handle may be reversibly attached to a conventional tooth brush handle for use on both sides of the mouth.

A further object of the invention resides in the provision of a construction which is simple in operation and comparatively cheap to manufacture.

With the above and other objects in view, reference will be had to the accompanying drawing, in which:

Figure 1 is a fragmentary perspective view showing the manner in which the device of the present invention is used, Figure 2 is a perspective view of the supplemental handle, Figure 3 is a fragmentary view in elevation thereof, Figure 4 is a longitudinal sectional view taken substantially on the line 4—4 of Figure 3, Figure 5 is a horizontal sectional view taken substantially on the line 5—5 of Figure 3, and Figure 6 is a detail distended perspective view.

Referring to the drawing, the reference numeral 10 designates the handle of a conventional tooth brush.

The device of the invention comprises a shank 11. This shank 11 carries a hooked member 12 upon one end thereof. The hooked member 12 is preferably flat and of rectangular cross sectional form, and comprises a nose 13 and a main body portion 14. The main body portion 14 is formed with a housing 15 having extended arms 16 which are also connected to a socketed portion 17 which receives the shank 11 and which may be secured to the shank 11 by rivets 18. The portion between the arms 16 is provided with a bearing seat 19 and centrally disposed with respect to this bearing seat 19 there is a positioning lug or the like 20.

Slidably mounted in the housing 15 and cooperating with the nose of the hooked member 12 there is a sliding member 21 which has a threaded extension 22 and an angular or a beveled end 23. This member is adapted in its sliding engagement to cooperate with the nose of the hooked member 12 and together therewith clamp opposite side edges of the handle 10 of the tooth brush, which may be of any conventional type.

Means is provided to move the member 21 relative to the hooked member 12 and this means comprises a nut 25. The nut 25 is interiorly threaded as at 26 for engagement with the threaded portion 22 of the sliding member 21. This nut 25 is mounted within the arms 16, heretofore described, and is maintained in position by engagement over the positioning lug 20, which extends upwardly into the end portion 28 of the nut 25, it being understood that the nut 25 is preferably oval in general shape. The nut 25 is provided with a knurled or roughened portion 29 to facilitate its being rotated between the arms 16.

The clamping member 21 is provided preferably with two oppositely disposed flat faces 30 and 31 which prevent its turning in the housing 15, the latter being rectangular in cross sectional form, as illustrated in Figure 5.

By this construction it will be apparent that when the nut 25 is rotated in one direction, the member 21 will be moved towards the nose 13 of the hooked member 12 to clamp the handle of a conventional tooth brush and to secure the supplemental handle thereto. The parts are so arranged that the supplemental handle will be attached to the tooth brush in such a manner as to extend therefrom at right angles as illustrated. It will also be noted that the supplemental handle may be attached to the handle of a tooth brush upon opposite sides thereof merely by loosening the nut 25 and turning the supplemental handle around and clamping upon the opposite side of the tooth brush handle. This provides for operation upon opposite sides of the mouth by means of the supplemental handle.

With the supplemental handle attached to the handle of a conventional tooth brush it will be obvious that the parts are so positioned as to render the tooth brush capable of use in an up and down manner in the mouth for the purpose of brushing the teeth in a direction longitudinally of the teeth rather than transversely thereof and that this action is gained with facility over the ordinary manner of use of the conventional type or form of tooth brush.

While the invention has been herein disclosed in its preferred form it is obvious that it may be constructed in other forms without departing from the spirit thereof.

Having thus described the invention, what is claimed as new, is:

In a device of the character described, a handle, an elongated housing secured to and projecting longitudinally from one end of said handle, extended arms connecting the housing to the handle, there being an open portion of the housing between said arms, a hooked member rigidly carried by and extending from the free end of said housing, said hook member having relatively broad flat surfaces at the shank and hook portions thereof, a threaded member mounted for sliding movement in the housing, said threaded member having a beveled end cooperating with the hooked end to clamp an element between the threaded member and said hooked end in a manner to force the element so clamped rearwardly against the shank of the hook, an internally threaded nut mounted in the open portion of the housing between the said extended arms and having threaded engagement with the threaded member to move it towards and away from the hooked end of the housing, and a bearing member for said nut.

IRVING PENSKY.